United States Patent
Tan et al.

(10) Patent No.: US 11,489,583 B2
(45) Date of Patent: Nov. 1, 2022

(54) TWO-WAY WIRELESS RELAY TRANSMISSION METHOD SUITABLE FOR MULTIPLE RELAY NODES

(71) Applicant: University of Electronic Science and Technology of China, Chengdu (CN)

(72) Inventors: Xuesong Tan, Chengdu (CN); Xingyu Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 70 days.

(21) Appl. No.: 17/126,058

(22) Filed: Dec. 18, 2020

(65) Prior Publication Data

US 2022/0173791 A1    Jun. 2, 2022

(30) Foreign Application Priority Data

Dec. 1, 2020   (CN) .......................... 202011386915.2

(51) Int. Cl.
*H04B 7/155*   (2006.01)
*H04L 49/90*   (2022.01)

(52) U.S. Cl.
CPC ............. *H04B 7/155* (2013.01); *H04L 49/90* (2013.01)

(58) Field of Classification Search
CPC ................................ H04B 7/155; H04L 49/90
See application file for complete search history.

(56) References Cited

U.S. PATENT DOCUMENTS

| 2009/0268662 A1* | 10/2009 | Larsson ................ H04L 1/0041 370/328 |
| 2010/0220644 A1* | 9/2010 | Reznik ................. H04L 1/0076 370/315 |
| 2020/0296792 A1* | 9/2020 | Tan ....................... H04L 1/1874 |

FOREIGN PATENT DOCUMENTS

CN    109728880 A    5/2019

OTHER PUBLICATIONS

Sang Joon Kim et al., A class of Bi-directional multi-relay protocols, IEEE International Symposium on Information Theory, 2009, pp. 349-353.

(Continued)

*Primary Examiner* — Charles C Jiang
*Assistant Examiner* — Biswajit Ghose
(74) *Attorney, Agent, or Firm* — Bayramoglu Law Offices LLC

(57) ABSTRACT

A two-way wireless relay transmission method suitable for multiple relay nodes proposes a transmission solution based on a Decode-and-Forward (DF) technology and Network Coding (Network Coding, NC) technology suitable for a two-way wireless relay network. The method has an advantage of achieving a maximum spectrum efficiency based on the DF technology, and proposes a retransmission-free error control solution to avoid a problem of error spreading brought about by the NC technology to obtain an effective transmission throughput that is superior to existing solutions.

1 Claim, 3 Drawing Sheets

(56) References Cited

OTHER PUBLICATIONS

Qimin You et al., A Multihop Transmission Scheme With Detect-and-Forward Protocol and Network Coding in Two-Way Relay Fading Channels, IEEE Transactions on Vehicular Technology, Jan. 2012, pp. 433-438, vol. 61, No. 1.

Qiang Huo et al., Novel Multihop Transmission Schemes Using Selective Network Coding and Differential Modulation for Two-Way Relay Networks, IEEE ICC—Wireless Communications Symposium, 2013, pp. 5924-5928.

Petar Popovski et al., Bi-directional Amplification of Throughput in a Wireless Multi-Hop Network, 2006, pp. 588-593.

\* cited by examiner

TWO-WAY WIRELESS RELAY TRANSMISSION METHOD SUITABLE FOR MULTIPLE RELAY NODES

CROSS REFERENCE TO THE RELATED APPLICATIONS

This application is based upon and claims priority to Chinese Patent Application No. 202011386915.2, filed on Dec. 1, 2020, the entire contents of which are incorporated herein by reference.

TECHNICAL FIELD

The invention belongs to a field of wireless communication technology, and particularly relates to a two-way wireless relay transmission method suitable for multiple relay nodes.

BACKGROUND

In order to perform peer-to-peer wireless transmission and exchange of data and information of interest to each other under the condition of limited node transmission power, two wireless terminal nodes that are far apart or have experienced severe channel fading can rely on sequential data forwarding of multiple relay nodes to complete two-way communication. At this time, the combination of the two terminal nodes with all relay nodes constitutes a two-way wireless relay transmission network.

Existing relay technologies such as Amplify-and-Forward (AF) and Decode-and-Forward (DF) can be applied to each relay node of the two-way wireless relay transmission network. On the other hand, the two-way wireless relay transmission technology based on Analog Network Coding (ANC) or Digital Network Coding (DNC) can achieve a better overall transmission throughput than the two-way relay transmission mechanism based on the traditional store-and-forward mode.

Since the AF mode may cause transmission errors generated by a single channel error to spread to the entire two-way wireless relay network, and the ANC technology also requires each network node to precisely perform self-information cancellation and accurately estimate wireless channel state information, it is difficult for the two-way wireless relay technology based on AF and ANC to achieve an actual transmission performance comparable with its theoretically optimal effect. Compared with the former, the two-way wireless relay transmission technology based on DF and DNC has higher practical value.

In the prior art, for an n-relay two-way wireless transmission network, wherein n can be any integer not less than 3, "S. J. Kim, N. Devroye, and V. Tarokh, "A class of Bi-directional multi-relay protocols," Proc. *IEEE International Symposium on Information Theory*, Seoul, Korea, 2009" discloses a two-way relay transmission technology based on DF and DNC that can support exchange of a pair of data packets between two terminal nodes within every n+2 time slots. The main disadvantage of this technology is that the two-way transmission throughput is inversely proportional to the number of network relay nodes, which makes it unsuitable for two-way wireless relay networks with a large number of relay nodes. In order to overcome this defect, "Q. You, Z. Chen, and Y Li, "A Multihop Transmission Scheme With Detect-and-Forward Protocol and Network Coding in Two-Way Relay Fading Channels," *IEEE Transactions on Vehicular Technology*, Vol. 61, No. 1, pp. 433-438, 2012" proposes to design, for a two-way wireless relay transmission network having at least 5 relay nodes, a two-way relay transmission technology based on DF and DNC that can support exchange of a pair of data packets between two terminal nodes within every 5 time slots. "Q. Huo, L. Song, Y. Li, and B. Jiao, "Novel Multihop Transmission Schemes Using Selective Network Coding and Differential Modulation for Two-Way Relay Networks," *IEEE International Conference on Communications*, pp. 5924-5928, 2013" and Chinese Patent Application No. 201910191513.8 propose a two-way relay transmission technology based on DF and DNC that shortens the time interval required for two terminal nodes to exchange a pair of data packets to 4 and 3 time slots, respectively. In particular, the transmission technology proposed by Chinese Patent Application No. 201910191513.8 can achieve the optimal average transmission throughput, i.e. 0.667 packets/time slots, of a single-relay two-way wireless transmission technology based on DF and DNC (which is disclosed in "P. Popovski and H. Yomo, "Bi-directional amplification of throughput in a wireless multi-hop network," Proc. *IEEE VTC Spring* 2006, Melborne, Australia, pp. 588-593, 2006").

However, both of the transmission technologies proposed by "Q. Huo, L. Song, Y. Li, and B. Jiao, "Novel Multihop Transmission Schemes Using Selective Network Coding and Differential Modulation for Two-Way Relay Networks," *IEEE International Conference on Communications*, pp. 5924-5928, 2013" and Chinese Patent Application No. 201910191513.8 are based on methods similar to Automatic Repeat-reQuest (ARQ) to discover and correct transmission errors that may occur in two-way relay transmission, so as to avoid transmission errors of a single packet from being spread to the two terminal nodes of the two-way relay transmission network and causing the two terminal nodes to be unable to correctly receive and decode subsequent data packets. In this error correction mode, each sending node may repeatedly retransmit the same erroneous data packet multiple times, and there is a possibility that the erroneous data packet cannot be finally corrected due to multiple retransmission failures, resulting in the effective transmission throughput of the two-way wireless relay transmission network under non-ideal channel conditions being much lower than 0.667 packets/time slots, and inability to completely solve the problem of transmission error spread. Therefore, how to design a two-way relay transmission mechanism based on DF and DNC that can effectively avoid transmission error spread and maximize effective transmission throughput without retransmission of data packets has become an urgent problem to be solved.

SUMMARY

Aiming at the error control mechanism of the existing two-way wireless relay transmission technology based on DF and DNC, which has the defects of reduced transmission performance caused by multiple retransmissions and the possibility that transmission errors cannot be corrected, the present invention proposes a two-way wireless relay transmission method suitable for any number n of relay nodes (where n≥2) based on DF and DNC technologies. This method does not require each network node to retransmit an error data packet in order to prevent the transmission error from spreading, so as to avoid affecting decoding accuracy of subsequent data packets of each terminal node upon receiving a single error data packet. At the same time, this method can still support exchange of a pair of data packets between two terminal nodes within every 3 consecutive time slots, thus achieving the theoretically optimal transmission throughput of 0.667 packets/time slots.

The technical solutions of the present invention are as follows:

For an n-relay two-way wireless transmission network as shown in FIG. 1, the present invention designs the following two-way wireless relay transmission method based on DF and DNC technologies:

Step 1: numbering two terminal nodes as 0 and n+1 respectively, and numbering n relay nodes as 1, 2, 3, . . . , n, such that for any integer k∈[0, n], nodes k and k+1 are two neighbor nodes of the two-way relay transmission network.

Step 2: configuring a packet buffer (PB) for each node i∈[0, n+1] of the two-way relay transmission network, such that each terminal node, i.e. node 0 or node n+1, will use the buffer to temporarily store a single data packet successfully received by the terminal node from the neighbor node; and each node j∈[1, n] will use the buffer to temporarily store a data packet to be sent generated by performing XOR operation. At the same time, configuring a transmission buffer (TB) for node 0 (or node n+1) of the network to temporarily store all data packets to be sent generated by node 0 (or node n+1). Wherein, before the two-way relay transmission starts, each node is required to initialize its PB into a data packet $\vec{0}$, that is, an all-0 bit packet having a fixed length.

Step 3: starting from time slot 0, each node of the two-way relay transmission network relays transmission of data packets sent by node 0 and node n+1 according to the following rules:

(3.1) each node i∈[0, n+1] can send data packets only within time slots (i modulo 3), 3+(i modulo 3), 6+(i modulo 3), . . . , 3k+(i modulo 3), . . . , and receive data packets from neighbor nodes within remaining time slots. Wherein k is any non-negative integer.

(3.2) When node j∈[1, n] gets a transmission opportunity, if the data packet buffered in its PB is $\vec{0}$, it remains silent; otherwise, it will send the data packet buffered in its PB. In particular, after node 1 or node n sends its data packet, it is required to update its PB as data packet $\vec{0}$.

(3.3) When node j∈[1, n] receives a data packet sent by a neighbor node, it is required to first perform XOR operation on the received data packet with the data packet buffered in its PB, and then update its PB according to the XOR result.

(3.4) When node 0 or node n+1 gets a transmission opportunity, it is required to first send the first data packet buffered in its TB, then perform XOR operation on the first data packet buffered in its TB with the data packet buffered in its PB, update its PB according to the XOR result, and finally pop the first data packet buffered in its TB from its TB.

(3.5) When node 0 or node n+1 receives the data packet sent by the neighbor node, it will perform sequentially the following two operations:

(3.5.1) performing XOR operation on the received data packet with the data packet buffered in its PB. If the XOR result is not $\vec{0}$, submitting the XOR result to an upper layer protocol for further processing.

(3.5.2) Updating its PB with the received data packet.

The beneficial effects of the present invention are mainly embodied in the following two aspects: on one hand, the method of the present invention can ensure that any single transmission error that occurs in a two-way wireless relay network under non-ideal channel conditions will only cause each terminal node to receive a unique erroneous data packet, thereby effectively ensuring that the node correctly decodes and receives subsequent data packets. On the other hand, for any n-relay two-way relay transmission network, where n≥2, the method of the present invention can still ensure that two terminal nodes can exchange a pair of data packets within every 3 time slots, thereby achieving the theoretically optimal transmission throughput, i.e. 0.667 packets/time slots, of the two-way relay transmission mechanism based on DF and DNC, and can obtain an effective transmission throughput superior to the existing two-way relay transmission technology of the same type under non-ideal channel conditions.

DETAILED DESCRIPTION OF THE EMBODIMENTS

The present invention will be described in detail below in conjunction with the accompanying drawings and simulation examples to prove the practicability of the present invention.

For the convenience of analysis, suppose that the lengths of the data packets sent by two terminal nodes (i.e. node 0 and node n+1) are both fixed at 8472 bits, and the wireless channel transmission rate between any two adjacent nodes is fixed at 11 Mbit/s.

Figure 1:
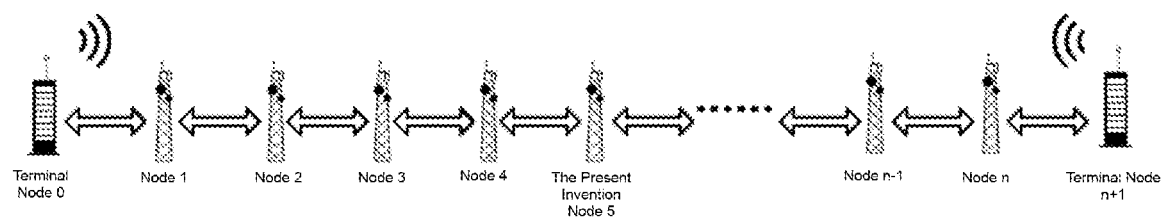
FIG. 1 is a schematic diagram of an n-relay two-way wireless transmission network composed of 2 terminal nodes and n relay nodes according to the present invention.
Figure 2:
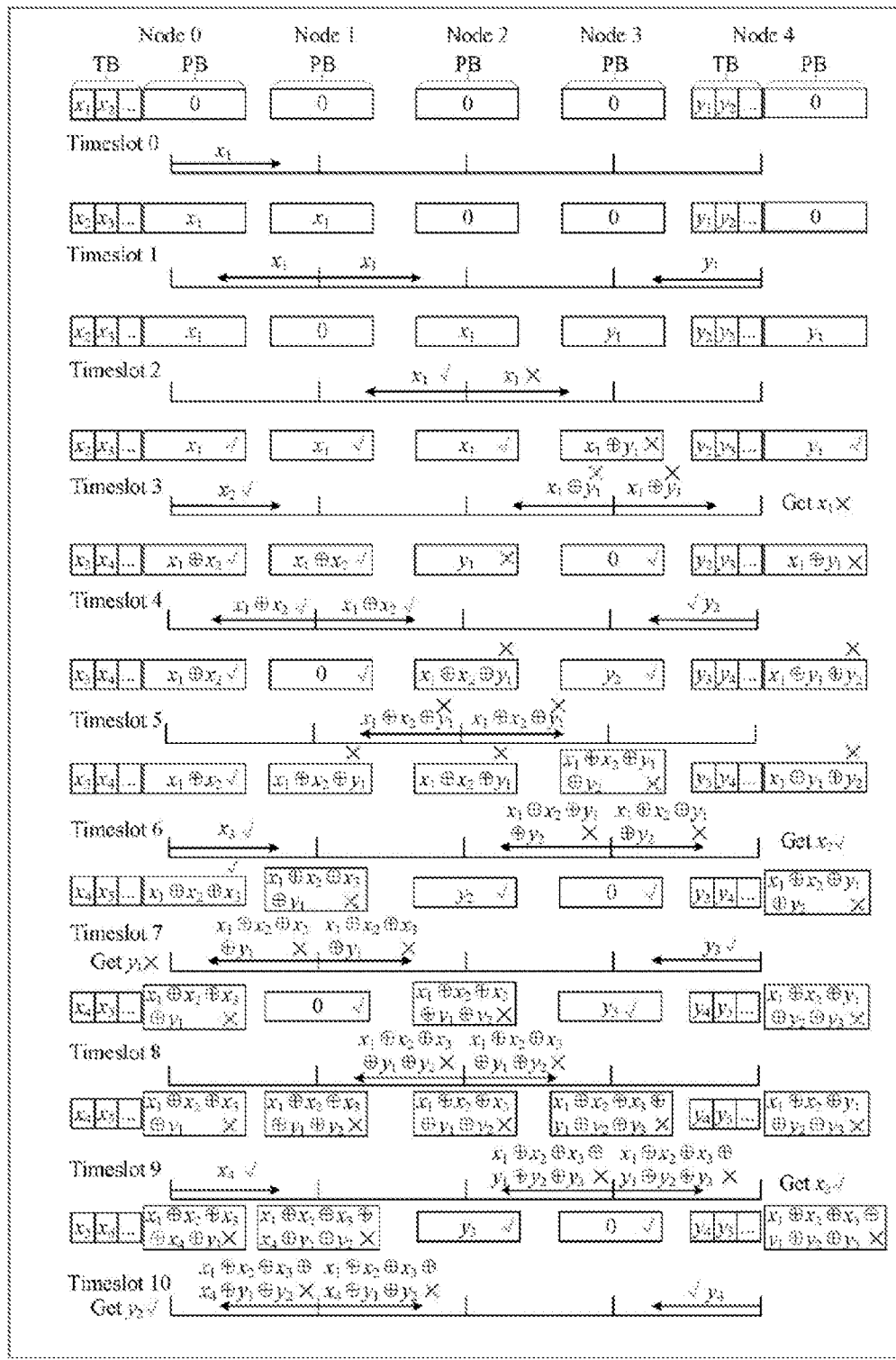
FIG. 2 is a schematic diagram of the operation of the first 11 time slots in the network using the two-way relay transmission method according to the present invention.

FIG. 1 is a schematic diagram of a two-way relay transmission network composed of 2 terminal nodes and n relay nodes considered by the present invention. In particular, when n=3, the two-way relay transmission network shown in FIG. 1 is the 3-relay two-way wireless transmission network shown in FIG. 2. FIG. 2 shows the 3-relay two-way wireless transmission network in the first 11 time slots, namely time slots 0, 1, . . . , 10, and shows an example of possible single transmission error spreading process over the entire network. Wherein, each network node, whether it is an terminal node or a relay node, is configured with a data buffer (PB), and each terminal node, namely node 0 or node n+1, is configured with a transmission buffer (TB). At the beginning of each time slot, the PB buffer content of each relay node is displayed in a single box above this node, and the TB and PB buffer contents of each terminal node are respectively displayed in the left and right boxes above this node. Each symbol 0 in the figure represents a data packet $\vec{0}$, namely an all-0 bit packet having a fixed length, and the symbol √ or × near each data packet respectively represent that the content of the data packet is correct or incorrect.

The two-way relay transmission algorithm based on digital network coding technology designed by the present invention includes the following steps:

Step 1: numbering 2 terminal nodes as 0 and 4 respectively, and numbering 3 relay nodes as 1, 2 and 3, such that for any integer i∈[0, 3], nodes i and i+1 are two neighbor nodes of the two-way relay transmission network.

Step 2: configuring a packet buffer (PB) for each node i∈[0, 4] of the two-way relay transmission network, such that each terminal node, i.e. node 0 or node 4, will use the buffer to temporarily store a single data packet successfully received by the terminal node from the neighbor node; and each node j∈[1, 3] will use the buffer to temporarily store a data packet to be sent generated by performing XOR operation. At the same time, configuring a transmission buffer (TB) for node 0 (or node 4) of the network to temporarily store all data packets to be sent generated by node 0 (or node 4). Wherein, before the two-way relay transmission starts, each node is required to initialize its PB into a data packet $\vec{0}$, that is, an all-0 bit packet having a fixed length.

Step 3: starting from time slot 0, each node of the 3-way relay transmission network relays transmission of data packets sent by node 0 and node n+1 according to the following rules:

(3.1) each node i∈[0, 4] can send data packets only within time slots (i modulo 3), 3+(i modulo 3), 6+(i modulo 3), . . . , 3k+(i modulo 3), . . . , and receive data packets from neighbor nodes within remaining time slots. Wherein k is any non-negative integer.

For example, node 0 can respectively send its generated data packets $x_1, x_2, x_3, \ldots$ only within time slots 0, 3, 6, . . . , node 4 can respectively send its generated data packets $y_1, y_2, y_3, \ldots$ only within time slots 1, 4, 7, . . . , and node 3 also can respectively send data packets buffered in its PB only within time slots 3, 6, 9, . . . .

(3.2) When node j∈[1, 3] gets a transmission opportunity, if the data packet buffered in its PB is $\vec{0}$, it remains silent; otherwise, it will send the data packet buffered in its PB. In particular, after node 1 or node n sends its data packet, it is required to update its PB as data packet $\vec{0}$.

For example, when node 3 gets a transmission opportunity within time slot 0, since the data packet buffered in its PB is $\vec{0}$, it remains silent in this time slot. When node 3 gets a transmission opportunity within time slot 3, it sends the data packet $x_1 \oplus y_1$ buffered in its PB. In addition, after transmission of data packets in time slots 1, 4, 7, . . . , node 1 immediately updates its PB with the data packet $\vec{0}$. Similarly, after transmission of data packets in time slots 3, 6, 9, . . . , node 3 immediately updates its PB with the data packet $\vec{0}$. Conversely, after transmission of data packets in time slots 2, 5, 8, . . . , the content buffered in PB of node 2 remains unchanged.

(3.3) When node j∈[1, 3] receives a data packet sent by a neighbor node, it is required to first perform XOR operation on the received data packet with the data packet buffered in its PB, and then update its PB according to the XOR result.

For example, upon respectively receiving data packet $x_1$ or $y_2$ sent by node 2 or node 4 within time slot 2 or time slot 4, node 3 is required to first perform XOR operation on the received data packet with the data packet buffered in its PB, i.e. $y_1$ or $\vec{0}$, and then update its PB according to the XOR result, i.e. $x_1 \oplus y_1$ or $y_2$.

(3.4) When node 0 or node n+1 gets a transmission opportunity, it is required to first send the first data packet buffered in its TB, then perform XOR operation on the first data packet buffered in its TB with the data packet buffered in its PB, update its PB according to the XOR result, and finally pop the first data packet buffered in its TB from its TB.

For example, upon respectively getting a transmission opportunity within time slots 0, 3 or 6, node 0 will first send the first data packet buffered in its PB, i.e. $x_1, x_2$ or $x_3$, then perform XOR operation on the first data packet buffered in its TB with the data packet buffered in its PB, i.e. $\vec{0}, x_1$ or $x_1 \oplus x_2$, update its PB according to the XOR result, i.e. $x_1$, $x_1 \oplus x_2$ or $x_1 \oplus x_2 \oplus x_3$, and finally pops the first data packet buffered in its TB, i.e. $x_1, x_2$ or $x_3$, from its TB, such that the first data packet buffered in its TB becomes $x_2, x_3$ or $x_4$.

(3.5) When node 0 or node n+1 receives the data packet sent by the neighbor node, it will perform sequentially the following two operations:

(3.5.1) performing XOR operation on the received data packet with the data packet buffered in its PB. If the XOR result is not $\vec{0}$, submitting the XOR result to an upper layer protocol for further processing.

For example, after respectively receiving data packets $x_1$, $x_1 \oplus x_2$ or $x_1 \oplus x_2 \oplus x_3 \oplus y_1$ from node 1 within time slots 1, 4 or 7, node 0 will first perform XOR operation on the received data packet respectively with the data packets buffered in its PB $x_1, x_1 \oplus x_2$ or $x_1 \oplus x_2 \oplus x_3$, and respectively generate XOR results $\vec{0}, \vec{0}$ or $y_1$. At the end of time slots 1 or 4, since the XOR result is $\vec{0}$, node 0 will not submit the corresponding XOR result to the upper layer protocol. On the contrary, at the end of time slot 7, since the XOR result is not $\vec{0}$, node 0 will submit the corresponding XOR result $y_1$ to the upper layer protocol.

(3.5.2) Updating its PB with the received data packet.

For example, after respectively receiving data packets $x_1$, $x_1 \oplus x_2$ or $x_1 \oplus x_2 \oplus x_3 \oplus y_1$ from node 1 within time slots 1, 4 or 7, node 0 will respectively update its PB as the received data packets, i.e. $x_1, x_1 \oplus x_2$ or $x_1 \oplus x_2 \oplus x_3 \oplus y_1$.

It can be seen from FIG. 2 that when an error occurs in transmission of the data packet $x_1$ by node 2 to node 3 within time slot 2 while all other data packets are transmitted correctly, the error will cause node 0 to receive and decode an erroneous data packet $y_1$ within time slot 7 and update the PB of node 0 as an erroneous data packet $x_1 \oplus x_2 \oplus x_3 \oplus y_1$. Since the erroneous bits of data packets $y_1$ and $x_1 \oplus x_2 \oplus x_3 \oplus y_1$ are at the same position, for the data packet $x_1 \oplus x_2 \oplus x_3 \oplus x_4 \oplus y_1$ buffered in the PB of node 0 at the beginning of time slot 10, its erroneous bits are at the same position as those of the data packet $y_1$. This allows node 0 to decode a correct data packet $y_2$ based on rule (3.5.1) after receiving the data packet $x_1 \oplus x_2 \oplus x_3 \oplus x_4 \oplus y_1 \oplus y_2$ having a same erroneous hit position within time slot 10. By analogy, the subsequent data packets $y_3, y_4, \ldots$, which are respectively received and decoded by node 0 within time slots 13, 16, . . . , are also correct.

On the other hand, when an error occurs in transmission of data packet $x_1$ by node 2 to node 3 within time slot 2 while all other data packets are transmitted correctly, this error will also cause node 4 to receive and decode an erroneous data packet $x_1$ within time slot 3. For similar reasons, the subsequent data packets $x_2$, $x_3$, ..., which are respectively received and decoded by node 4 within time slots 6, 9, ..., are also correct.

Obviously, with the increase of two-way relay transmission time slots, as two terminal nodes send or receive more and more data packets, the XOR operation for generating the data packets buffered by their PBs becomes more and more complicated. However, since the XOR operation will always generate a single data packet having a fixed bit length, this operation will not make the implementation of each terminal node more complicated, and the terminal node is not required to identify any data packet involved in this XOR operation.

Figure 3:
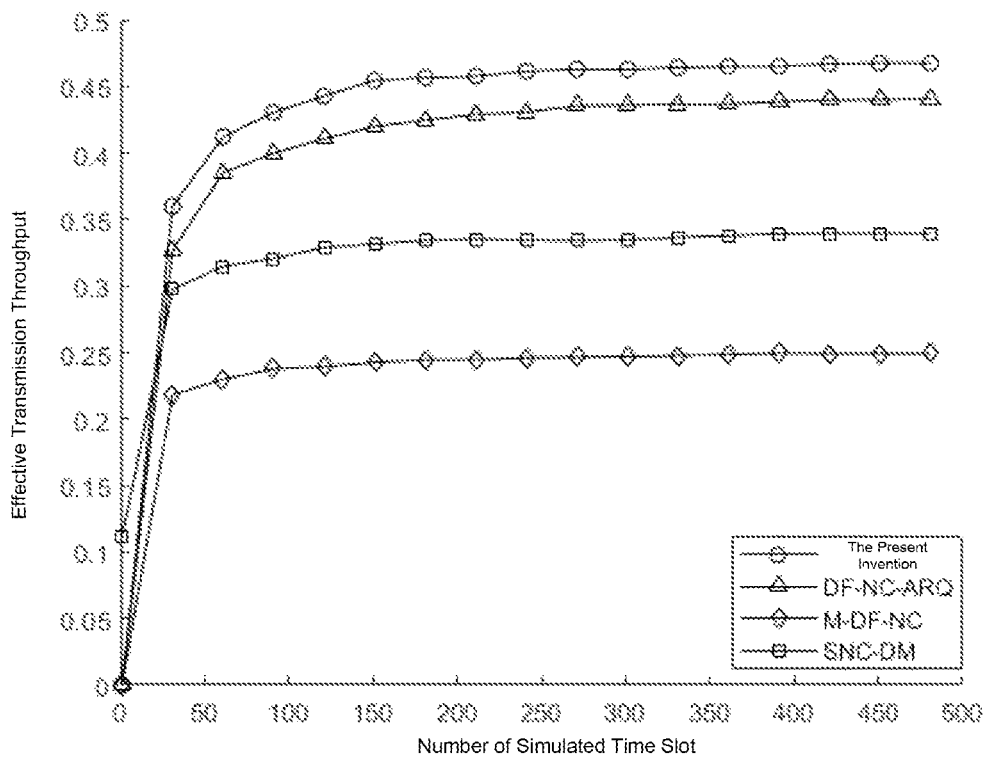
FIG. 3 is a comparison diagram of effective transmission throughputs of a 4-relay two-way wireless transmission network based on the traditional method and the method of the present invention varied with the number of simulated time slots; this diagram is obtained by averaging the simulation results based on 50 random channel parameters when the signal-to-noise ratio of the wireless channel between each pair of adjacent network nodes is 45 dB.

FIG. 3 shows a comparison diagram of effective network transmission throughputs of a 4-relay two-way wireless transmission network based on "Q. You, Z. Chen, and Y. Li, "A Multihop Transmission Scheme With Detect-and-Forward Protocol and Network Coding in Two-Way Relay Fading Channels," *IEEE Transactions on Vehicular Technology*, Vol. 61, No. 1, pp. 433-438, 2012" (referred to as M-DF-NC), "Q. Huo, L. Song, Y Li, and B. Jiao, "Novel Multihop Transmission Schemes Using Selective Network Coding and Differential Modulation for Two-Way Relay Networks," *IEEE International Conference on Communications*, pp. 5924-5928, 2013" (referred to as SNC-DM) and Chinese Patent Application No. 201910191513.8 (referred to as DF-NC-ARQ) and the two-way relay transmission method proposed by the present invention varied with the number of simulated time slots when the wireless channel quality is poor (signal-to-noise ratio=45 dB). Obviously, with the continuous increase in the number of two-way relay transmission time slots, the effective network transmission throughputs of the above four solutions tend to be stable gradually, and the effective network transmission throughput of the method proposed by the present invention is also significantly higher than the other three two-way relay transmission methods. This shows that the two-way relay transmission method proposed by the present invention can effectively control the problem of transmission error spread possibly occurs in the two-way relay transmission network under non-ideal channel conditions, thereby obtaining better packet transmission performance than the existing two-way relay transmission method of the same type.

Figure 4:
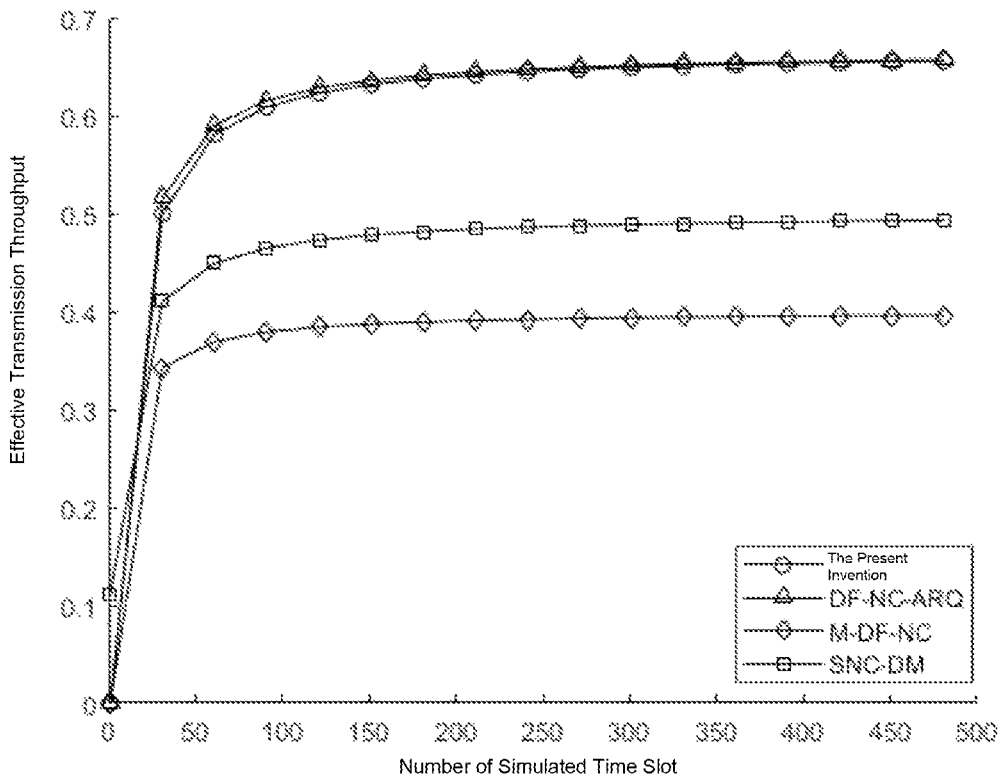
FIG. 4 is a comparison diagram of effective transmission throughputs of a 4-relay two-way wireless transmission network based on the traditional method and the method of the present invention varied with the number of simulated time slots; this diagram is obtained by averaging the simulation results based on 50 random channel parameters when the signal-to-noise ratio of the wireless channel between each pair of adjacent network nodes is 100 dB.

FIG. 4 shows a comparison diagram of effective network transmission throughputs of a 4-relay two-way wireless transmission network based on M-DF-NC, SNC-DM and DF-NC-ARQ and the method proposed by the present invention varied with the number of simulated time slots when the wireless channel quality is good (signal-to-noise ratio=100 dB). Obviously, with the continuous increase in the number of two-way relay transmission time slots, the effective network transmission throughputs of the above four solutions tend to be stable gradually, and both methods of the present invention and DF-NC-ARQ can achieve an approximate optimal network transmission throughput (i.e., 0.667 packets/time slots), while the effective transmission throughputs of the other two two-way relay transmission methods are far from the optimal throughput.

What is claimed is:

1. A two-way wireless relay transmission method suitable for multiple relay nodes comprising the following steps:
S1. numbering two terminal nodes as 0 and n+1 respectively, and numbering other n relay nodes as 1, 2, 3, ..., n, for any integer k∈[0, n], wherein nodes k and k+1 are neighbor nodes of a two-way relay transmission network;
S2. configuring a packet buffer (PB) for each node i∈[0, n+1] of the two-way relay transmission network; for a terminal node of the two terminal nodes, using the PB to temporarily store a single data packet received by the terminal node from its neighbor node; and for a non-terminal node, using the PB to temporarily store a data packet to be sent generated by performing an XOR operation;
configuring a transmission buffer (TB) for each terminal node of the two terminal nodes to temporarily store all data packets to be sent generated by the terminal node;
S3. Starting from timeslot 0, each node of the two-way relay transmission network transmits the data packets generated by the two terminal nodes, the terminal node 0 and the terminal node n+1, according to the following rules:
1) each node i∈[0, n+1] sends the data packets only within timeslots (i modulo 3), 3+(i modulo 3), 6+(i modulo 3), ..., 3k+(i modulo 3), ..., and receive the data packets from its neighbor nodes within remaining time slots timeslots, wherein k is any non-negative integer;
2) when a node j∈[1, n] gets a transmission opportunity, if the data packet buffered in the PB of a node j is $\vec{0}$, the node j remains silent, wherein the data packet $\vec{0}$ refers to an all-0 bit packet having a fixed length; otherwise, the node j sends the data packet buffered in its PB;
3) after sending the data packet buffered in its PB, only node 1 or node n updates the data packet buffered in its PB to a data packet 0;
4) when the node j∈[1, n] receives the data packet sent by a neighbor node, the node j first performs the XOR operation on the received data packet with the data packet buffered in its PB and then updates its PB according to an XOR result;
5) when a terminal node gets a transmission opportunity, it first sends the first data packet buffered in its TB to its neighbor node, then performs the XOR operation on the first data packet buffered in its TB with the data packet buffered in its PB, updates its PB according to the XOR result, and finally pops the first data packet buffered in its TB;
6) when a terminal node receives the data packet sent by its neighbor node, it will perform the following two operations sequentially:
6.1) performing the XOR operation on the received data packet with the data packet buffered in its PB; if the XOR result is not $\vec{0}$, submitting the XOR result to an upper layer protocol for further processing;
6.2) updating its PB with the received data packet.

\* \* \* \* \*